United States Patent [19]

Webber et al.

[11] Patent Number: 4,770,029
[45] Date of Patent: Sep. 13, 1988

[54] VALVE TESTING METHOD AND DEVICE

[75] Inventors: Arthur H. Webber, Amesbury; Herbert Cook, Revere, both of Mass.

[73] Assignee: Atwood & Morrill Co., Inc., Salem, Mass.

[21] Appl. No.: 898,532

[22] Filed: Aug. 21, 1986

[51] Int. Cl.$^4$ .............................................. G01M 3/28
[52] U.S. Cl. ............................................. 73/46; 29/705
[58] Field of Search .................. 29/705, 723, 400 N, 29/402.03, 407; 73/46, 40.5 R

[56] References Cited

U.S. PATENT DOCUMENTS

| | | | |
|---|---|---|---|
| 2,462,116 | 2/1949 | MacLachlan | 73/40 |
| 2,934,943 | 5/1960 | Carrie | 73/46 |
| 3,394,584 | 7/1968 | Mayer | 73/45.2 |
| 3,531,078 | 9/1970 | Hose et al. | 251/54 |
| 3,919,880 | 11/1975 | Seyd et al. | 73/49.8 |
| 3,950,983 | 4/1976 | Slinger | 73/46 |
| 4,055,985 | 11/1977 | Munz | 73/49.2 |
| 4,520,655 | 6/1985 | Owens | 73/46 |
| 4,571,820 | 2/1986 | Matsumoto et al. | 29/402.03 X |

Primary Examiner—Stewart J. Levy
Assistant Examiner—Joseph W. Roskos
Attorney, Agent, or Firm—Lahive & Cockfield

[57] ABSTRACT

A fixture for testing and servicing a MSIV of a nuclear power generation plant includes a cover plate for bolting to the valve body and a support member extending from the plate for supporting the valve stem. A pressure cylinder attaches to the support member for loading the stem to conduct a leak rate test. Means are provided for pressurizing the valve body to perform a leakage test. Stem bearings spaced apart along the stem provide accurate stem alignment, and prevent bending of the stem under test loading. Seals between the fixture, the body and the stem permit pressurization of the valve body above the poppet, permitting a leak test of the MSIV without reassembly of the actuator structure. In another embodiment, a collar having an axially directed thrust face mounts on the stem and bears against a thrust bearing to permit rotation of the stem during assembly.

10 Claims, 7 Drawing Sheets

VALVE TESTING METHOD AND DEVICE

TECHNICAL FIELD

Figure 1:
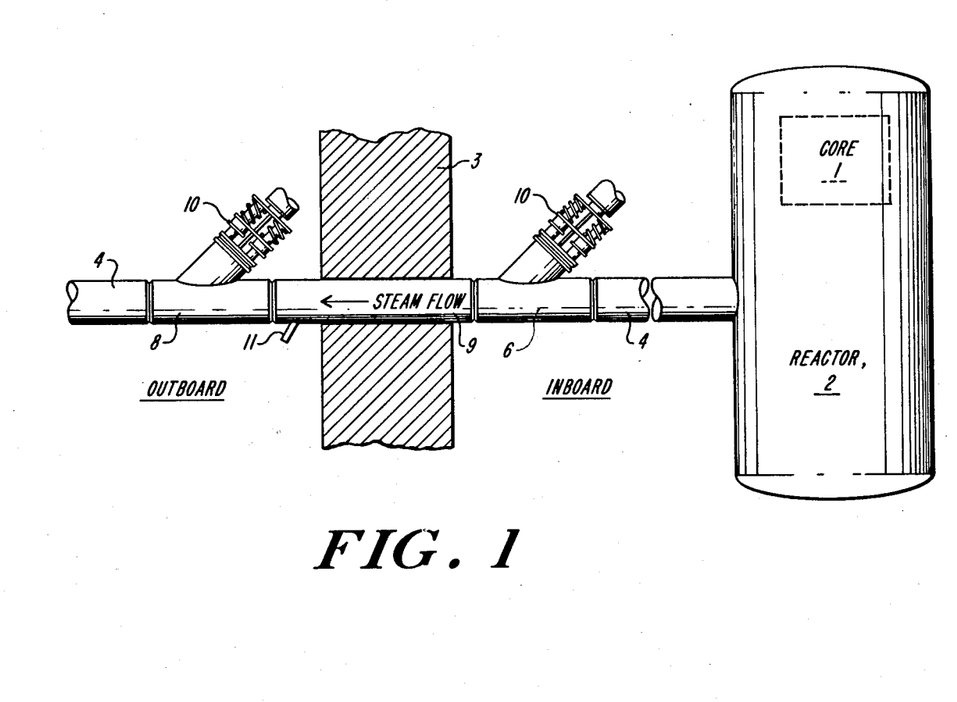
FIG. 1 is a diagram of a BWR showing inboard and outboard MSIV's.

The present invention relates to a method and apparatus for servicing the main steam isolation valve (MSIV) of a boiling water reactor (BWR) or other nuclear power plant. Such plants include a radioactive source in a boiler core contained within a containment structure to boil water and generate high pressure steam. The steam circulates in a conventional manner for driving electrical generating turbines or similar equipment. FIG. 1 shows a general schematic representation of a BWR, having a core 1 of radioactive material, within a boiler 2 located in a reinforced and highly secured containment structure 3. A main steam conduit 4 passes through the wall of structure 3 for carrying the radioactive high temperature and high pressure steam to the turbines or other utilization devices for electrical power generation. Conduit 4 passes serially through an inboard or first main steam isolation valve 6 and an outboard or second main steam isolation valve 8.

In the event of loss of integrity of core elements or other emergency conditions within the BWR which might result in escape of radioactivity, MSIVs 6, 8 are shut down to absolutely contain the radioactive material within the containment structure 3. For this purpose, each valve is provided with an actuator structure 10. Typically, actuator structure 10 includes a complex assembly having fluid actuated pressure cylinders for positively closing or opening the valves, various spring operated safety features for assuring closing in the absence of external control signals, damping or shock absorbing suspension or spring elements, and electrical controls and sensors of various sorts for actuating, or for providing feedback signals from, the foregoing actuation or safety elements. The actuating assembly communicates with a centralized control system of the BWR for receiving control signals from the central unit and for providing status signals thereto.

An MSIV is a critical element for the containment of radioactivity, and is required under applicable practices and federal regulations to meet critical performance criteria. Among these criteria is the local leak rate test (LLRT) criterion, which requires that the valve, when pressurized with a low pressure gas, allow a leakage past its valve seat in the closed position of typically no more than 11.5 scfh. In the United States, by regulation, this test is performed every 12 to 18 months during refueling of the reactor when the plant is closed down.

When a tested MSIV fails to meet the regulatory criteria, it must be reworked so that its performance characteristics come within the required tolerance. Because of the size of the valve, e.g., 20 to 30 inches diameter, and also because of the complexity of disassembling the actuator portion of the valve, the disassembly, refiguring or reworking, as required, reassembly and testing of a MSIV may take five days or longer. Moreover, when reassembled and tested if the valve fails to pass the LLRT, it must be disassembled, reworked, reassembled and retested.

Because of the magnitude of investment in a BWR, and the high cost associated with down-time, it is desirable to provide a faster, more certain method of servicing such valves.

OBJECTS AND SUMMARY OF THE INVENTION

It is an object of the invention to provide a fixture for servicing a MSIV of a boiling water reactor.

It is another object of the invention to provide a fixture for servicing a MSIV which permits testing of the serviced valve without time consuming reassembly thereof.

It is another object of the invention to provide a fixture for servicing a MSIV which supports the valve in its operative position to permit testing or alignment of components while not requiring assembly of extraneous components during the servicing thereof.

These and other features are obtained in a fixture for servicing a MSIV of a BWR in which a cover plate bolts to the body of the valve and an axial support member extends from the plate for supporting the valve stem while permitting at least axial, and, in one embodiment, rotational motion of the valve poppet. A pressure cylinder mounted on the support member loads the stem for conducting the local leak rate test. Spaced apart stem bushings supported in the fixture provide accurate stem alignment during servicing, and prevent bending of the stem under test loading. Seals placed between the fixture and the body, and between the fixture and the shaft, permit pressurization of the short segment of interconnecting pipe 9 from above the poppet through connection or fitting. In this manner a leak test of the outboard MSIV may be performed without reassembly of the actuator structure.

A method of servicing a MSIV according to the invention includes the steps of mounting a cover plate on the valve body, mounting a support member including spaced apart stem bearings on the cover plate so as to support the valve stem in alignment, applying loading to the stem when so supported, and providing pressurized gas on one side of the valve seat to test leakage across the valve seat.

BRIEF DESCRIPTION OF THE DRAWINGS

These and other features of the invention will be understood with reference to the drawings, in which.

DETAILED DESCRIPTION

FIG. 1, discussed briefly above, shows a representative layout of the reactor and main steam outlet of a BWR nuclear plant. Main steam isolation valves 6, 8 are placed on opposing sides of the containment wall 3, with a short segment of interconnecting pipe 9 spaced between the two valves. According to the generally accepted method of performing the local leak rate test, actuators 10 of valves 6, 8 are closed, and low pressure gas is applied to a fitting 11 communicating with pipe segment 9. As discussed above, when the leakage rate exceeds a specified threshhold, a valve must be disassembled, and its seat reworked to obtain an acceptable seal.

Figure 2:
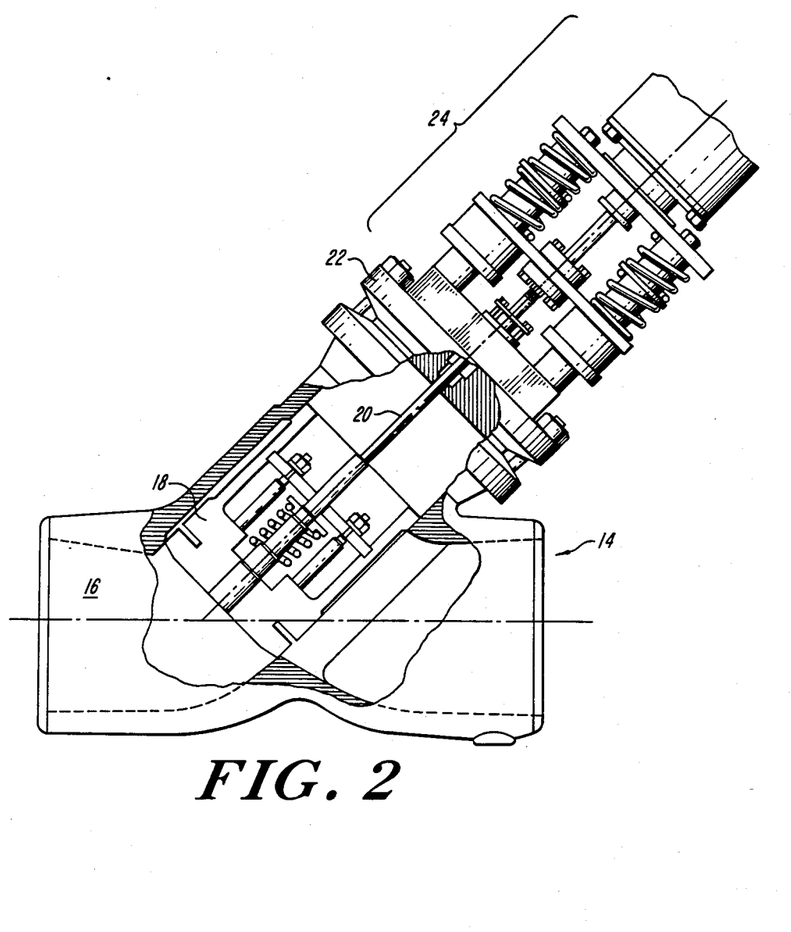
FIG. 2 is a representative cutaway view of a MSIV.

FIG. 2 is a diagram of a representative MSIV 14, such as valve 6 or 8 of FIG. 1. As shown, valve 14 includes a valve body 16, a poppet 18 having stem 20, a valve cover assembly 22, and an actuating assembly 24. As shown, actuating assembly 24 comprises numerous elements. In the representative valve shown, actuating assembly 24 includes a double acting pneumatic cylinder with associated power conduits and control sensors; dampening and travel control devices such as a dashpot and spring loading assembly; various support and framing units such as a spring seat assembly and shaft coupling unit; and related items. The actuating assembly shown is by way of example only, and diverse other configurations may be employed in the field, in accordance with the actual control and safety assemblies utilized in a particular BWR. It will be appreciated that for compliance with the leak rate criterion, the LLRT test must be performed with the valve fully assembled. Accordingly the foregoing elements of actuator assembly 24 must be reassembled, after reworking of the valve, to run the local leak rate test.

Figure 3:
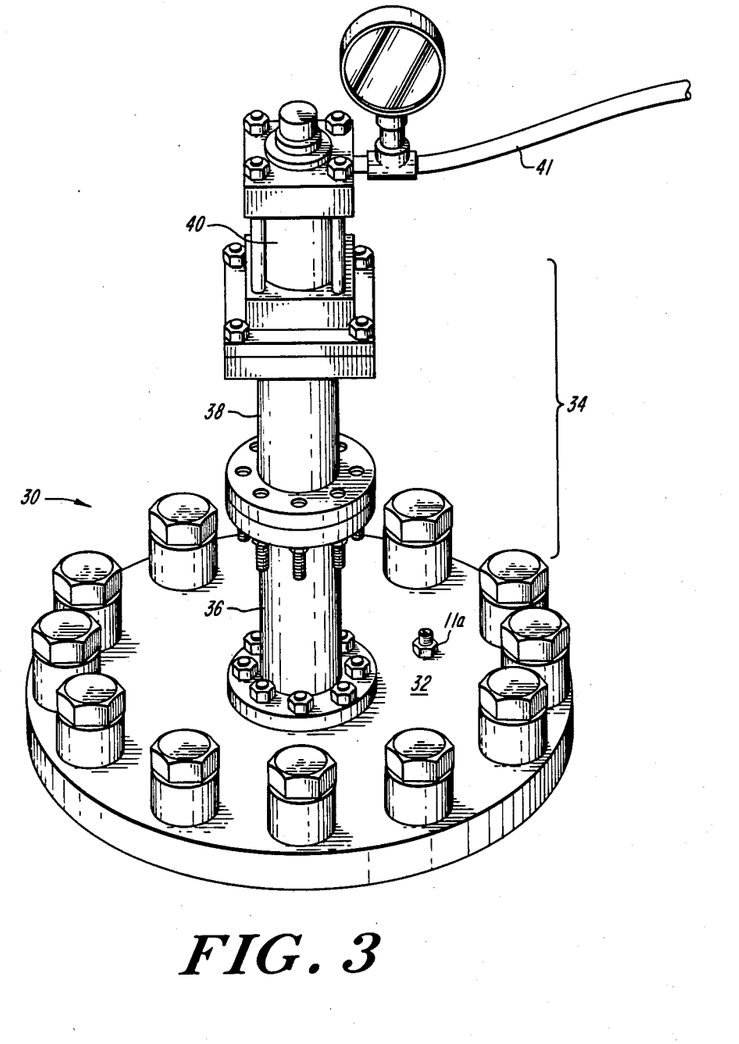
FIG. 3 is a perspective view of one embodiment of a test fixture according to the present invention.

FIG. 3 shows a perspective view of a test fixture 30 according to the present invention for servicing a MSIV such as the valve of FIG. 2. The fixture 30 includes a cover plate 32, a support member noted generally 34 and including, in this embodiment, first and second tubular segments 36, 38, and a pressure cylinder 40 mounted atop the support member. A hand-operated hydraulic pump unit 42 (shown in FIG. 4) connects to the pressure cylinder 40 via hydraulic hose 41.

According to the method of the invention, the apparatus shown in FIG. 3 is placed on the valve body in lieu of the cover 22 and actuating assembly 24 to provide the necessary centering and alignment of the valve stem for testing the valve, and to provide a loading of the stem for performing leak tests. It has been found that when tested using such a fixture, a valve which performs within test tolerances mounted with the fixture will also pass the test when fully reassembled with its cover and actuator assembly.

Figure 4:
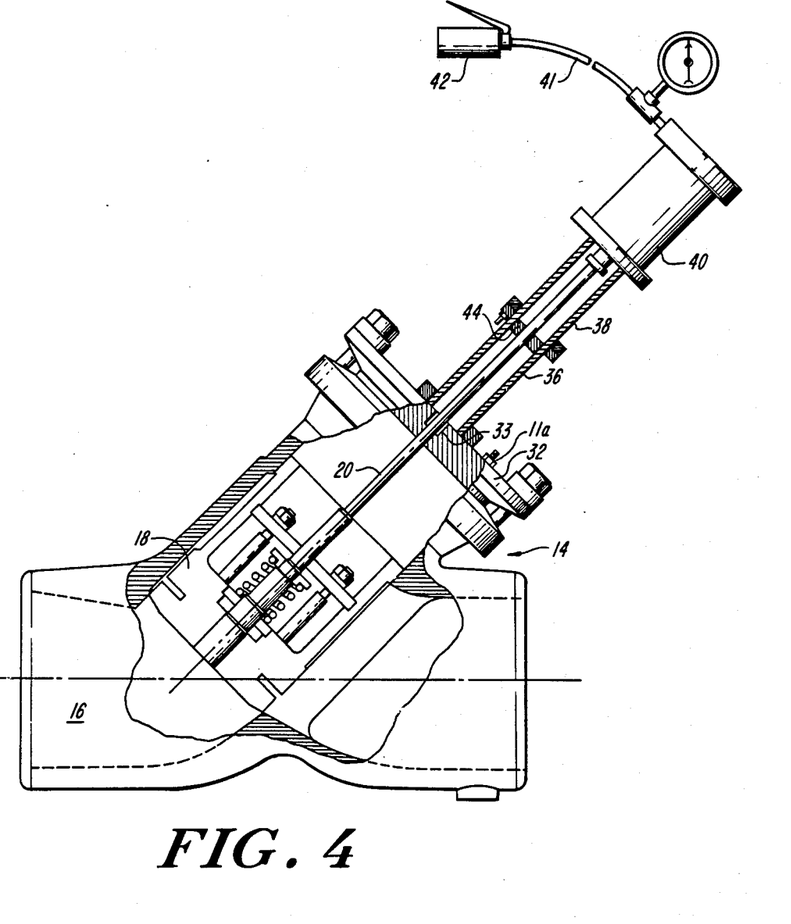
FIG. 4 is a cutaway view of a MSIV with the fixture of FIG. 3 attached.

Further details of a fixture and of a method of testing of the valve according to the invention will be understood by reference to FIG. 4, which shows a perspective cutaway view of a valve, such as the valve of FIG. 2, with the testing fixture of FIG. 3 attached thereto. The numbering of valve elements is identical to that of FIG. 2. As shown, the testing fixture includes a cover plate 32 which bolts to the valve body in lieu of the normal valve cover. A valved fitting 11a, discussed below in connection with the method of practicing the invention, communicates through the cover plate with the region of the valve body above the poppet. Plate 32 has a central bore housing a stem bushing 33. A first support member 36 centrally mounts on plate 32 over the stem bushing 33, and extends to approximately midway along the length of the protruding valve stem 20. A second stem bushing 44 is centrally mounted at the end of support member 36, and a second support member 38 extends upward therefrom to support a power cylinder 40. Power cylinder 40 delivers loading to the stem for performing tests. Cylinder 40 may be, for example, a hydraulic cylinder having a 5 inch bore and actuated by a manually-operated hydraulic pump unit 42. The pump unit may, for example, deliver pressures up to 2,000 to 4,000 psi for causing the hydraulic cylinder to exert a stem loading pressure, to close the valve pilot stroke and firmly seat the valve poppet, in the range of 20,000 to 40,000 pounds. The provision of axially centered support and bearing members 32, 33, 36, 38, 40, 44 assures that the valve poppet 18 and stem 20 are maintained in proper orientation during the aforementioned stroking and loading operation. The provision of two stem bearings, 33, 44 spaced along the stem 20 eliminates bending moments when the valve is loaded for performing the leakage test.

It will be appreciated that each of the members, 32, 36, 38, 40 may be quickly and conveniently bolted together into the assembly. The only control system connection is the hydraulic fluid line 41 extending from hand pump 42 to hydraulic cylinder 40, which may be installed very quickly. Thus the use of service fixture 30 eliminates the need for the repeated assembly and disassembly of the actuator and control system of the valve often required during a testing operation under conventional practice.

Figure 5:
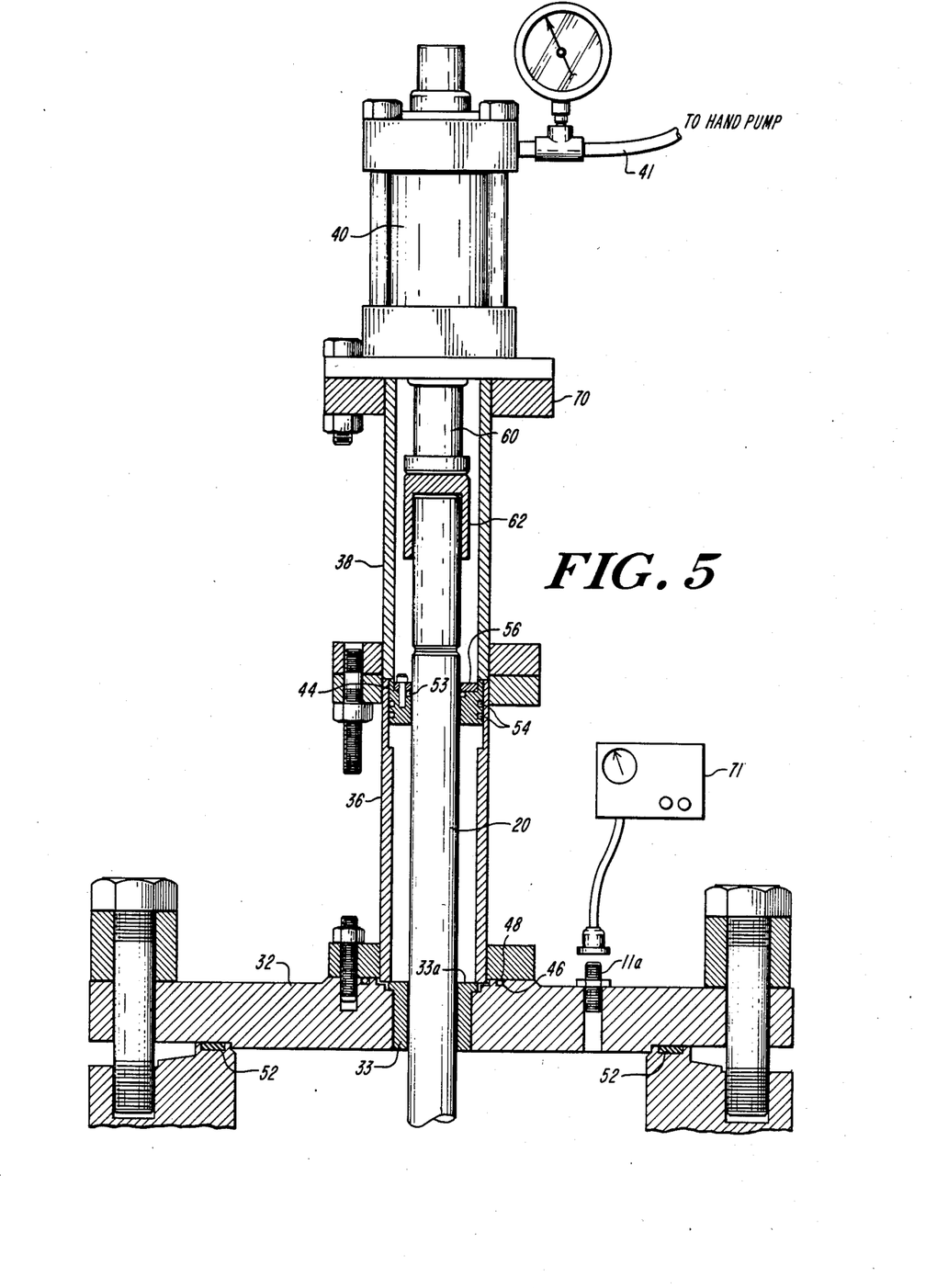
FIG. 5 is a detailed cross section of the fixture of FIG. 3.

FIG. 5 is a more detailed cross-section of the fixture of FIG. 3, further showing details of the shaft support and sealing structure of the fixture. As shown in FIG. 5, cover plate 32 is secured to the valve body 16, with a sealing gasket 52 therebetween. Plate 32 is drilled and tapped for receiving studs or mounting bolts to secure the flange of the support member 36 thereto. Plate 32 also has a central bore therein for housing stem bushing 33. Bushing 33 may, for example, have an outer diameter in the range of 3.5 inches and an inner diameter of approximately 2 inches for accommodating the 2 inch stem 20 of the valve shown. In the upper face of plate 32 a circular groove 46 holds a sealing ring 48 for providing a pressure-tight seal between plate 32 and the flange of member 36. Stem bushing 33 has a thrust wall 33a having one face resting on plate 32 and the opposing face butting against the end of tubular member 36. In this manner bushing 33 is secured in position.

At the other end of tubular member 36 a second stem bushing 44 fits concentrically in a mating axially centered bore within the member 36. Bushing 44 has an internal O-ring 53 set therein for sealing against the stem. O-ring retainer 56 compresses the O-ring in position and provides a tight seal about the stem. External O-rings 54 provide a pressure-tight seal between bushing 44 and the surrounding bore. With members 32, 33, 36, 44 assembled, the stem 20 protrudes several inches above the end flange area of member 36.

Continuing with the description of FIG. 5, a second tubular member 38 fits over member 36 and is bolted thereto by a mating flange. This secures bushing 44 in position, and provides a mounting platform, including a flange portion 70 at the opposing end of member 38, upon which pressure cylinder 40 is mounted. Cylinder 40 has a piston-actuated plunger 60 which bears against a cap member 62 fitted over the stem 20 of the valve. Cap member 62 serves as a valve stem protector. Cylinder 40 connects, via a hydraulic hose 41, to pump unit 42 (FIG. 4). Also shown in FIG. 5 is a metered source of low pressure gas 71, which connects to fitting 11a, as described below.

The method of testing a MSIV according to the invention will now be described. First, with the valve assembled, pressure may be applied at fitting 11 (FIG. 1) between the inboard and outboard MSIVs with both valves closed, to determine the approximate combined level of leakage for both valves. The approximate leakage rate serves as a useful indicator of the amount of refiguring which a valve may possibly require. If the combined level of leakage exceeds the allowable level, the valve is disassembled and the actuating assembly and its components set aside, together with the valve cover. Various components thereof may be replaced in accordance with the usual service instructions of the manufacturer to cure worn or warped bushings, aged seals or springs, and other such parts. Such related repairs form no part of the present invention and accordingly will not be discussed further.

The valve poppet is then pulled, and the sealing faces and bearing surfaces thereof are measured or otherwise inspected for wear and other defects. Next the valve seating is restored by lapping in the conventional manner. At this same time, bearing surfaces of the body and poppet may be refigured. This is accomplished with the valve body in situ, according to a conventional procedure. Then, the valve poppet with its stem is replaced in the valve body and aligned. Cover plate 32, with bushing 33 therein, is bolted onto the valve body using sealing gasket 52. Support member 36 is then fitted over the valve stem and bolted down to the cover plate. The second stem bushing 44 is inserted in the upper end of tubular member 36 with its O-rings 53, 54, and sealing element 56 installed.

Cap member 62 is placed on the top of the stem, second tubular member 38 assembled over the stem, and pressure unit 40 fitted to the member 38. Pressure unit 40 is then actuated to provide the required level of stem loading, and the valve body is pressurized, e.g. by application of compressed air through fitting 11a (FIG. 5) in the cover plate 32 so as to pressurize the region of the valve body above the poppet and the short segment of interconnecting pipe 9. The rate of leakage of the compressed air is then monitored in a conventional fashion. Seals 48, 52, 53, 54, assure that the pressure does not leak through the service fixture, and accordingly all leakage measured will be indicative of leakage past the valve seats. In this manner, the leakage of the outboard valve is specifically tested, where the inboard valve is sealed in a conventional manner, e.g., by placing a steam plug upstream of the inboard valve, or by inserting a soft seal at the inboard valve. Alternatively, the combined leakage rates of the inboard and outboard valves may be determined, as results from the prior art leakage tests described above with reference to FIG. 1.

If the valve passes the leakage test, the stem loading is released, the valve body depressurized, the testing fixture removed from the valve body, and the actual valve cover plate and actuator assembly reinstalled. If the valve fails the leakage test, the lapping and refiguring are repeated until a good seal is obtained. In this manner, the actual reassembly of the complex actuator system is required only once, after the complete reworking of the valve has been achieved and the leakage test results brought within tolerance.

Figure 5A:
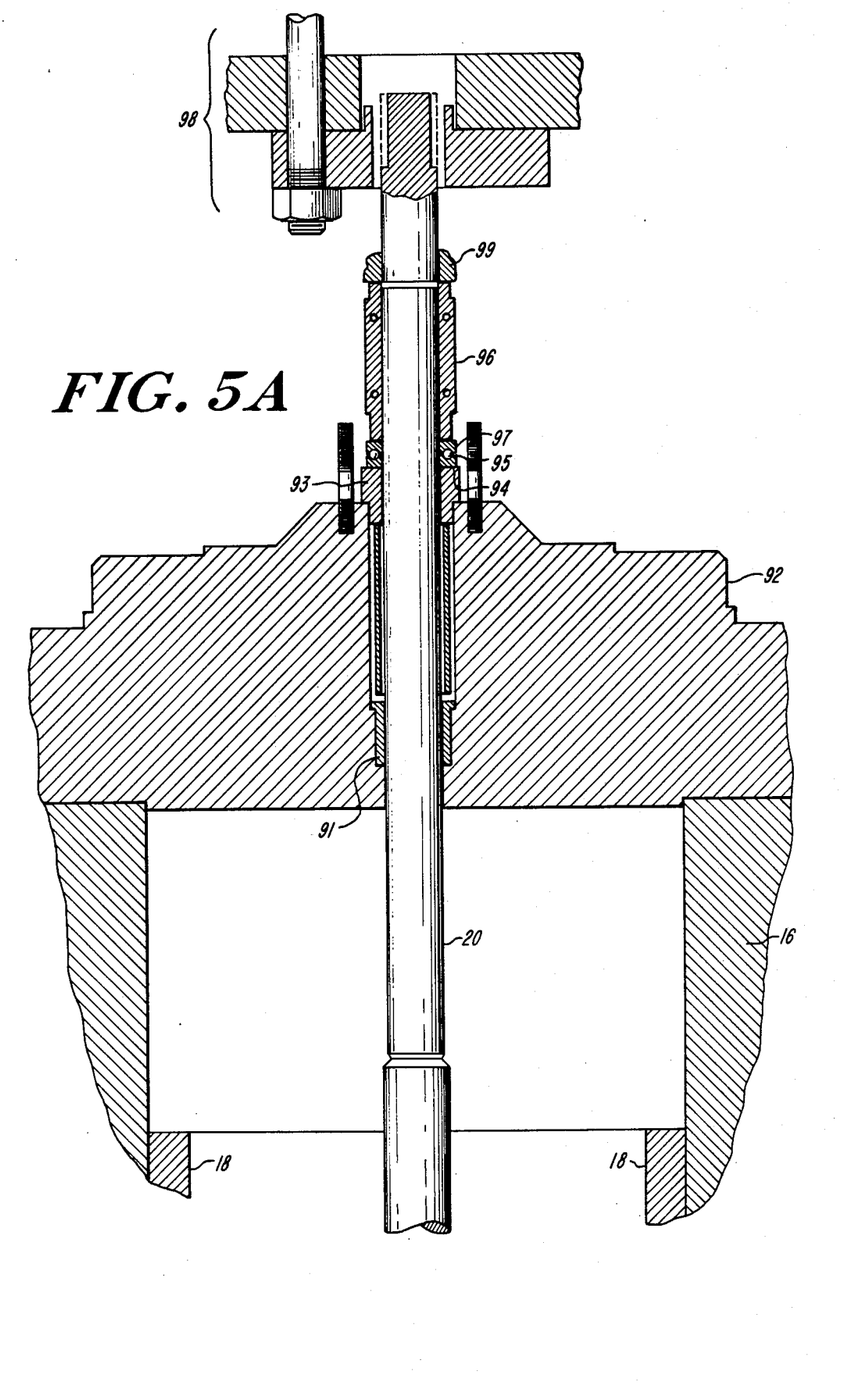
FIG. 5A is a cross-sectional view of another fixture according to the invention.

FIG. 5A shows another fixture according to a further aspect of the invention for servicing a MSIV. This fixture allows the poppet, once raised, to be rotated while supported by a thrust bearing, to permit proper rotational alignment of the poppet about the stem axis. As shown, a cover plate 92 fits over body 16. Cover 92 may be the conventional valve cover 22 of FIG. 2. A stem bushing 91 in the cover provides a first axial support for the poppet and stem assembly. A second stem bushing 93 having an upper thrust face 94 provides a second axial support or alignment member. A ball thrust bearing 95 rests on thrust face 94. A split collar 96 with a lower thrust face 97 attaches to the stem and supports it by bearing against ball thrust bearing 95, and thus thrust face 94. A keyed stem plate assembly 98 is threaded onto the stem and the key is inserted to maintain rotational alignment of the poppet and stem. The stem plate may be gripped by conventional mechanical elements, such as a spanner, for rotating the stem to permit alignment of the stem with the portion of the actuating assembly above. The actuation assembly is shown in greater detail in FIG. 2. A threaded jam nut 99 fits over stem 20 to lock against split collar 96.

Figure 6:
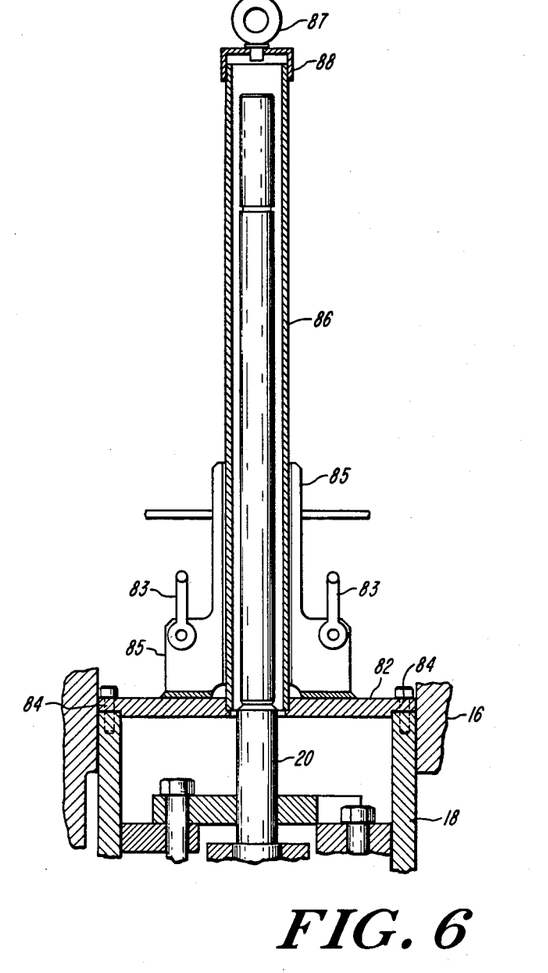
FIG. 6 is a cross-sectional view of another test fixture used in the practice of the invention.

FIG. 6 shows another fixture according to a further aspect of the invention for servicing a MSIV. In this aspect, a poppet lifting plate 82 of a diameter slightly less than the diameter of poppet 18 has two or more spaced apart holes 84 (shown in phantom) aligned with corresponding threaded holes in the poppet 18 for securing the plate 82 to the poppet. A tubular sheath 86 extends centrally upward from plate 82 over the valve stem, and an eye bolt 87 mounts in a cap 88 secured to the top of the sheath 86. L-shaped ribs 85 are welded to the sheath 86 and the plate 82 to maintain the axial alignment of sheath 86. Anchor shackles 83 are attached to the ribs 85 and provide lift points for raising the poppet and stem assembly from the valve body 16. It has been found that the configuration of lift points provided by eye bolt 87 and shackles 83 greatly facilitates maneuvering the poppet assembly during servicing. This fixture protects the valve stem and poppet from impact and from unwanted bending moments during handling.

It will be appreciated that the apparatus and method of servicing a MSIV according to the present invention has been described in reference to embodiments adapted to a particular prior art isolation valve. The invention having been thus disclosed, other variations and modifications will occur to those skilled in the art.

For example, in the embodiment of FIG. 5, second tubular member 38 may be replaced by stand-offs, housing, or support structures of a different shape. One or more of its functions of centrally supporting press unit 40 and securing second bushing 44 may be replaced by one or more separate elements such as a retaining plate, a stand-off block or other mechanical structures. The precise locations of the stem bushings 33, 44 may be varied. Also the positions of the seal may vary, or the seals may be omitted. All such variations, and others which may occur to those skilled in the art, are intended to be within the scope of the invention as defined by the following claims.

What is claimed is:

1. A service fixture for a main steam isolation valve (MSIV) of the type having a valve body and a poppet with a valve stem, and the poppet is movable along a nominal stem axis, wherein the fixture is adapted for fitting over the valve body, poppet, and valve stem, such fixture comprising:

a centering plate having a centering structure coaxial with the nominal valve stem axis and including means for securing the plate over the valve body, a first stem centering bearing supported by the centering structure, and a support member affixed to the plate and extending along the stem axis over the centering structure, said member including a second stem centering bearing at a position spaced apart along the axis from said first bearing.

2. A fixture according to claim 1, further including pressure means supported by the plate for applying pressure to the stem of the valve directed along the axis.

3. A fixture according to claim 2 wherein the support member comprises first and second co-axial tubing segments and means for joining said segments together so as to secure the second stem centering bearing therebetween in coaxial alignment with said stem.

4. A fixture according to claim 2 wherein the pressure means includes a fluid pressure cylinder.

5. A fixture according to claim 2, further including pressure sealing means for pressure sealing mating regions of the body, stem and fixture, and also including
    means for applying gas under pressure within the valve body, and
    means for measuring the rate of leakage of said gas from the body.

6. A fixture according to claim 1, wherein the support member includes a collar defining an axially-directed thrust face, and wherein a said bearing is a thrust bearing supported by the centering plate.

7. A fixture for testing a MSIV of a power plant, wherein the main steam isolation valve (MSIV) includes a valve body defining a fluid flow conduit, a valve seat in the body between an inlet and an outlet thereof, a valve poppet having a stem with a stem axis, said valve poppet being movable along the stem axis to sealingly fit against the valve seat for isolating the inlet from the outlet, and a valve cover, such fixture comprising
    a substitute cover plate having means for fitting to the valve housing, and an associated stem support means mounted on the cover plate for supporting the valve stem in alignment with the axis while simultaneously permitting axial motion thereof, said support means including two axially spaced apart stem bearings.

8. A fixture according to claim 7 further including pressure means for applying an axial load to the valve stem to permit testing of the valve for leakage under said load.

9. A fixture according to claim 8, further including means for pressure sealing mating surfaces of the body, the stem and the said fixture.

10. A fixture according to claim 9, further including
    means for applying pressurized gas within the housing, and
    means for determining the rate of leakage of the gas past the valve seat.

* * * * *